(12) United States Patent
Hetzel et al.

(10) Patent No.: US 11,141,917 B2
(45) Date of Patent: Oct. 12, 2021

(54) POWDER MODULE

(71) Applicant: CONCEPT LASER GMBH, Lichtenfels (DE)

(72) Inventors: Ralf Hetzel, Bad Staffelstein (DE); Christoph Schmidbauer, Neustadt bei Coburg (DE)

(73) Assignee: Concept Laser GmbH, Lichtenfels (DE)

( * ) Notice: Subject to any disclaimer, the term of this patent is extended or adjusted under 35 U.S.C. 154(b) by 109 days.

(21) Appl. No.: 16/157,820

(22) Filed: Oct. 11, 2018

(65) Prior Publication Data
US 2019/0160752 A1    May 30, 2019

(30) Foreign Application Priority Data
Nov. 24, 2017 (EP) ..................... 17203531

(51) Int. Cl.
*B29C 64/307* (2017.01)
*B29C 64/255* (2017.01)
(Continued)

(52) U.S. Cl.
CPC .......... *B29C 64/307* (2017.08); *B29C 64/153* (2017.08); *B29C 64/165* (2017.08); *B29C 64/245* (2017.08); *B29C 64/255* (2017.08); *B33Y 30/00* (2014.12); *B22F 12/00* (2021.01); *B33Y 10/00* (2014.12); *B33Y 40/00* (2014.12)

(58) Field of Classification Search
CPC ... B29C 64/307; B29C 64/245; B29C 64/165; B29C 64/153; B29C 64/255; B33Y 30/00; B33Y 10/00; B33Y 40/00; B22F 2003/1056; B22F 3/1055; B22F 2003/1057; B22F 2003/1058; B22F 2003/1059; B28B 1/00; B23K 26/08; B23K 9/04; B23K 26/342; G03F 9/7034; G03F 9/7003; G03F 9/7023; B23Q 11/0007; B23Q 11/0003;
(Continued)

(56) References Cited

U.S. PATENT DOCUMENTS 7,204,684 B2 *   4/2007  Ederer ................. B29C 64/259
                                                           425/174.4
10,252,336 B2 *  4/2019  Buller .................... B33Y 50/02

FOREIGN PATENT DOCUMENTS

CN   105346090 A   2/2016
CN   105538725     5/2016
(Continued)

OTHER PUBLICATIONS

European Search Opinion Corresponding to Application No. 17203531.3.
(Continued)

*Primary Examiner* — Leith S Shafi
(74) *Attorney, Agent, or Firm* — Dority & Manning, P.A.

(57) ABSTRACT

Powder module (5), in particular for an apparatus (1) for additively manufacturing of three-dimensional objects (2), which powder module (5) comprises a powder chamber (10) with at least one wall portion (11) defining a powder room, in which powder room a carrying element (9) is provided that is moveably supported relative to the powder chamber (10), at least one support unit (13) is adapted to provide a non-locating bearing of the carrying element (9) relative to the at least one wall portion (11).

13 Claims, 3 Drawing Sheets

(51) Int. Cl.
  *B29C 64/245* (2017.01)
  *B33Y 30/00* (2015.01)
  *B29C 64/153* (2017.01)
  *B29C 64/165* (2017.01)
  *B22F 12/00* (2021.01)
  *B33Y 10/00* (2015.01)
  *B33Y 40/00* (2020.01)

(58) Field of Classification Search
  CPC .............. B23Q 11/001; B23Q 11/0014; B23Q 11/0025
  See application file for complete search history.

(56) References Cited

FOREIGN PATENT DOCUMENTS

| | | |
|---|---|---|
| DE | 19905067 A1 | 8/2000 |
| EP | 2937163 A1 | 10/2015 |

OTHER PUBLICATIONS

European Search Report Corresponding to Application No. 17203531 dated Jun. 20, 2018.
Japanese Office Action Corresponding to Application No. 2018067206 dated May 24, 2018.

\* cited by examiner

POWDER MODULE

CROSS-REFERENCE TO RELATED APPLICATIONS

This application claims priority to European Patent Application serial no. 17 203 531.3 filed Nov. 24, 2017, the contents of which is incorporated herein by reference in its entirety as if set forth verbatim.

The invention relates to a powder module, in particular for an apparatus for additively manufacturing of three-dimensional objects, which powder module comprises a powder chamber with at least one wall portion defining a powder room, in which powder room a carrying element is provided that is moveably supported relative to the powder chamber.

Such powder modules for apparatuses for additively manufacturing of three-dimensional objects are generally known from prior art. Respective powder modules are adapted to receive (powdery) build material in a powder chamber comprising at least one wall portion, typically four walls, defining a powder room in which the build material is received. Inside the powder room a carrying element is arranged which is movably supported relative to the powder chamber, carrying build material that is received in the powder room.

It is possible to position the build material inside the powder chamber via a movement of the carrying element, for example to provide build material by moving the carrying element upwards or downwards, the carrying element to allow for fresh build material to be received in the powder room.

Further, it is known from prior art that accurately supporting the carrying element, in particular accurately positioning and accurately moving the carrying element, is critical for the object and process quality. Thus, tolerances of the carrying element, for example a powder table, relative to the powder chamber shall be kept as small as possible. During an additive manufacturing process, for example due to variable loads on the carrying element and due to variable ambient conditions inside the process chamber, in particular temperature differences, forces applied onto the carrying element may vary. For example, due to the thermal expansion caused by the energy input of the energy source, the carrying element and/or the power chamber may expand and therefore, the tolerances have to be chosen such that a movement of the carrying element relative to the powder chamber is still possible, wherein an oversize fit can be prevented that leads to high wear between the carrying element and the chamber wall portion or the respective guide the carrying element is guided in. Therefore, a compromise between an oversize fit and too much tolerance between the powder chamber and the carrying element has to be found.

It is an object to provide a powder module, in particular for an apparatus for additively manufacturing of three-dimensional objects, wherein the bearing, in particular the movement and the positioning, of the carrying element is improved.

The object is inventively achieved by a powder module according to claim 1. Advantageous embodiments of the invention are subject to the dependent claims.

The powder module described herein is a powder module for an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are operated during its operation. Exemplary functional units are a process chamber, a build material application device which is adapted to apply layers of build material in a build plane of the process chamber of the apparatus, an irradiation device which is adapted to selectively irradiate a build material layer disposed in the process chamber with at least one energy beam, and a stream generating device, which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The powder module is provided for carrying a volume of (powdered) build material inside a powder room that is delimited by a powder chamber. The powder chamber comprises wall portions that delimit the powder room. A respective powder module further comprises a carrying element carrying the build material, wherein the carrying element delimits the powder room, e.g. bottom sides. The powder module is moveably arranged inside the powder chamber, wherein the carrying element can, in particular, be moved upwards or downwards to provide fresh build material from the powder room or to receive more build material in the powder room, dependent on the type of powder module, e.g. a build module or a dose module.

The invention is based on the idea that at least one support unit is provided that is adapted to provide a non-locating bearing of the carrying element relative to the at least one wall portion. Thus, the support unit is not solidly mounted or connected with the carrying element and the chamber wall, but a movement between the support unit and the carrying element and the chamber wall is possible. The non-locating bearing provided by the support unit adds a degree of freedom to the bearing of the carrying element allowing for tolerances to be compensated, e.g. a thermal expansion of the bearing and/or the carrying element relative to the wall portion does not lead to an oversize fit, since the corresponding support unit may compensate the change of dimension by moving relative to the chamber wall and/or the carrying element. Therefore, it is not necessary to construct the powder module, in particular the powder chamber and the carrying element, with tolerance or play or oversize fit, as the support unit provides a non-locating bearing that therefore, adapts to the current dimensions of the carrying element and/or the powder chamber wall portion, e.g. a guide guiding the carrying element relative to at least one portion of the powder chamber wall.

By providing a non-locating bearing, forces that are applied between the carrying element and the at least one wall portion can be kept constant even if changes occur, such as changes in temperature conditions or a load distribution applied on the carrying element. The non-locating bearing further allows for an improved compensation of manufacturing tolerances, since the respective guide surface is not connected solidly to (solidly contacting) the carrying element (or a corresponding structure carrying the carrying element). The term "provide a non-locating bearing of the carrying element" may also be understood as the powder module comprising a non-locating bearing that is realized via the at least one support unit. Thus, the respective support unit may be deemed as part of the non-locating bearing the carrying element is supported relative to the powder chamber.

Further, the at least one support unit may movably connect the carrying element with the at least one wall portion, wherein the support unit is moveable relative to the at least one wall portion and to the carrying element. The support unit may be used to connect or to contact the carrying element with the at least one wall portion of the process chamber, respectively.

To provide the non-locating bearing of the carrying element, the support unit is moveable relative to the carrying element and relative to the at least one wall portion. The ability to move relative to the at least one wall portion allows to apply an essentially constant force onto the respective guide surface that is provided by the wall portion. Manufacturing tolerances of the wall portion or of the carrying element can be compensated in that the support unit is moved due to the tolerances and therefore, adapts to the guide surface. Additionally, changes during the manufacturing process, such as load changes or changes of conditions inside the powder chamber, in particular thermal expansion due to the energy input of the corresponding energy source, in particular a laser source, can also be compensated as the support unit is not solidly connected with the carrying element and therefore, is adapted to adjust to varying dimensions of the powder chamber and the carrying element.

According to a preferred embodiment, the powder module comprises at least one suspension unit that is adapted to support the support unit and is adapted to generate a suspension force onto the support unit moving, in particular pushing, the support unit against the at least one wall portion. Thus, the support unit is moved against the at least one wall portion, in particular pushed against the at least one wall portion, due to the suspension force generated by the suspension unit. In other words, the support unit contacts the at least one wall portion due to the suspension force generated by the suspension unit and applied onto the support unit. The suspension unit and the support unit therefore, act like a "damper" contacting the assigned guide surface provided by the at least one wall portion, absorbing manufacturing tolerances and compensating variances in the dimensions, in particular thermal expansion and load variances. The support unit and the suspension unit may be considered as an assembly. The support unit may particularly be integrated in the suspension unit and vice versa. The support unit may therefore, be considered as a part of the suspension unit, i.e. the part of the suspension unit contacting the guide surface and supporting the carrying element on the guide surface.

The suspension unit and the support unit may be arranged in that the support unit is preloaded via the suspension unit against the at least one powder chamber wall portion. The stiffness or spring rate of the suspension unit and the behavior of the suspension force related thereto upon a movement of the support unit against the suspension unit can in general be arbitrarily chosen. Preferably, the suspension force behaves essentially constant upon a typical movement of the support unit. Hence, a defined force onto the carrying element in movement direction leads to a constant movement of the carrying element independent of the current process conditions, since the suspension force that is transferred via the support unit onto the at least one wall portion remains essentially constant. Therefore, variances of the force applied on the carrying element via the bearing can be reduced or avoided.

According to another embodiment of the powder module, at least one first wall portion with a first orientation and at least one second wall portion with a second orientation may be provided, wherein at least one first support unit connecting the carrying element with the first wall portion is supported via at least one first suspension unit and at least one second support unit connecting the carrying element with the second wall portion is supported via at least one second suspension unit. According to this embodiment the at least two wall portions comprise different orientations, wherein a non-locating bearing is provided via the respective first and second suspension units connecting the respective first and second support units.

Thus, the carrying element is at least supported on both wall portions via one support unit supported via one suspension unit each. Therefore, manufacturing tolerances and effects of varying process conditions can be compensated in both directions or for both orientations the wall portions are oriented in, respectively. The two wall portions are to be considered as not arranged in parallel, but, for example, enclosing a defined angle, in particular both wall portions can to be regarded as arranged in perpendicular to each other.

The powder module can further be improved in that the powder chamber may be essentially cuboid, comprising two sets of opposing wall portions, wherein the carrying element is supported on at least one wall portion of every set via at least one moveable support unit. According to this embodiment, the powder chamber may be built as cuboid, comprising four walls surrounding and delimiting the powder room. The powder chamber therefore, comprises a rectangular cross-section (perpendicular to a movement direction of the carrying element). The four walls of the powder chamber are arranged in that two opposing walls are arranged essentially in parallel. The carrying element is supported via at least one moveable support unit, preferably supported via a corresponding suspension unit, on one of the opposing walls of every set. The bearing of the carrying element on the wall portions of the powder chamber can therefore, be considered as a cross pattern. Of course, the powder room is delimited bottom sides by the carrying element, e.g. built as dose plate or build plate.

According to another embodiment of the powder module, at least one side of the carrying element is provided with a suspension unit and a corresponding support unit, preferably providing a non-locating bearing, and the opposing side is provided with a locating bearing, in particular a support unit solidly connected with the carrying element, providing a locating bearing. Hence, one of two opposing sides of the carrying element, i.e. opposing sides on which the carrying element is supported on a corresponding chamber wall portion, is provided with a non-locating bearing and the other opposing side is provided with a locating bearing. In other words, the carrying element is connected, e.g. in contact with the powder chamber, via two support units arranged on opposing sides of the carrying element. One of the support units is solidly mounted on or connected with the carrying element while the other support unit is moveable relative to the carrying element and relative to the assigned powder chamber wall portion.

Therefore, one side can be solidly supported with the assigned powder chamber wall portion while the other (opposing) side is supported via the non-locating bearing provided by the moveable support unit that is preloaded via the suspension unit. Of course, it is also possible to provide a non-locating bearing on every side of the carrying element, wherein the combination of a non-locating bearing and a locating bearing on opposing sides is deemed more efficient.

Preferably, the provision of a locating bearing and a non-locating bearing on opposing sides of the carrying element is provided both in longitudinal and in traverse direction, i.e. on all sets of wall portions that are arranged in opposite orientations. In particular, with the powder chamber having cuboid shape, the provision of a locating and a non-locating bearing is provided for all four wall portions, wherein two opposing wall portions form a set of wall portions, as described above.

Further, the powder module may comprise at least two support units that are provided with the same wall portion. Therefore, the carrying element may be connected to (contacted, in particular supported by) the respective wall portion via two or more support units. The bearing of the carrying element via more than one support units increases the mechanical stability of the bearing, wherein additionally the force per support unit required to support the carrying element may be reduced compared to the support provided by a single support unit. Thus, the wear between the support units and the guide can be reduced.

The powder module may also comprise at least one support unit which is supported by at least two suspension units, in that at least two suspension units are assigned to the same support unit. Thus, an arbitrary combination of two or more suspension units is feasible, wherein for example at least two suspension units with different stiffness or spring rate may be combined. The at least two suspension units may further be arranged in parallel or in series. For example, a first type of suspension unit(s) may be provided to compensate manufacturing tolerances and a second type of suspension unit(s) may be provided to compensate varying process conditions, in particular thermal expansion.

Additionally or alternatively, at least one suspension unit may be provided that supports at least two support units. Hence, two or more support units, in particular support units that are assigned to the same side of the carrying element are supported via a common suspension unit. Thereby, the number of parts required can be reduced.

According to another embodiment of the powder module, at least one suspension unit is built as or comprises
- at least one spring element, in particular a plate spring and/or a coil spring and/or an elastic element, and/or
- at least one hydraulic element and/or
- at least one pneumatic element and/or
- at least one magnetic element.

Generally, the at least one suspension unit may be adapted to provide a suspension force to move at least one support unit against the assigned chamber wall portion. The suspension force may be generated via various elements, for example mechanically, hydraulically, pneumatically or magnetically. Of course, an arbitrary combination of different suspension units, e.g. spring elements and pneumatic elements is feasible.

Further, the at least one support unit may be built as or may comprise at least one sliding element, in particular a pad, and/or at least one guide element, in particular a rail.

The sliding element can be slid along the corresponding guide surface of the wall portion the sliding element is assigned to. The sliding element may, for example, be built as a guide element, e.g. a rail, additionally being adapted to guide the carrying element along the wall portion.

Besides, the invention relates to an apparatus for additively manufacturing of three-dimensional objects by means of successive layerwise selective irradiation and consolidation of layers of a build material which can be consolidated by means of an energy source, comprising at least one powder module comprising a powder chamber with at least one wall portion delimiting a powder room, in which powder room a carrying element is provided that is moveably supported relative to the powder chamber, wherein at least one support unit is provided that is adapted to provide a non-locating bearing of the carrying element relative to the at least one wall portion. Preferably, the at least one powder module may be built as a dose module and/or a build module.

Exemplary embodiments of the invention are described with reference to the Fig. The Fig. are schematic diagrams, wherein FIG. 1 shows an inventive apparatus for additively manufacturing three-dimensional objects.

Figure 1:
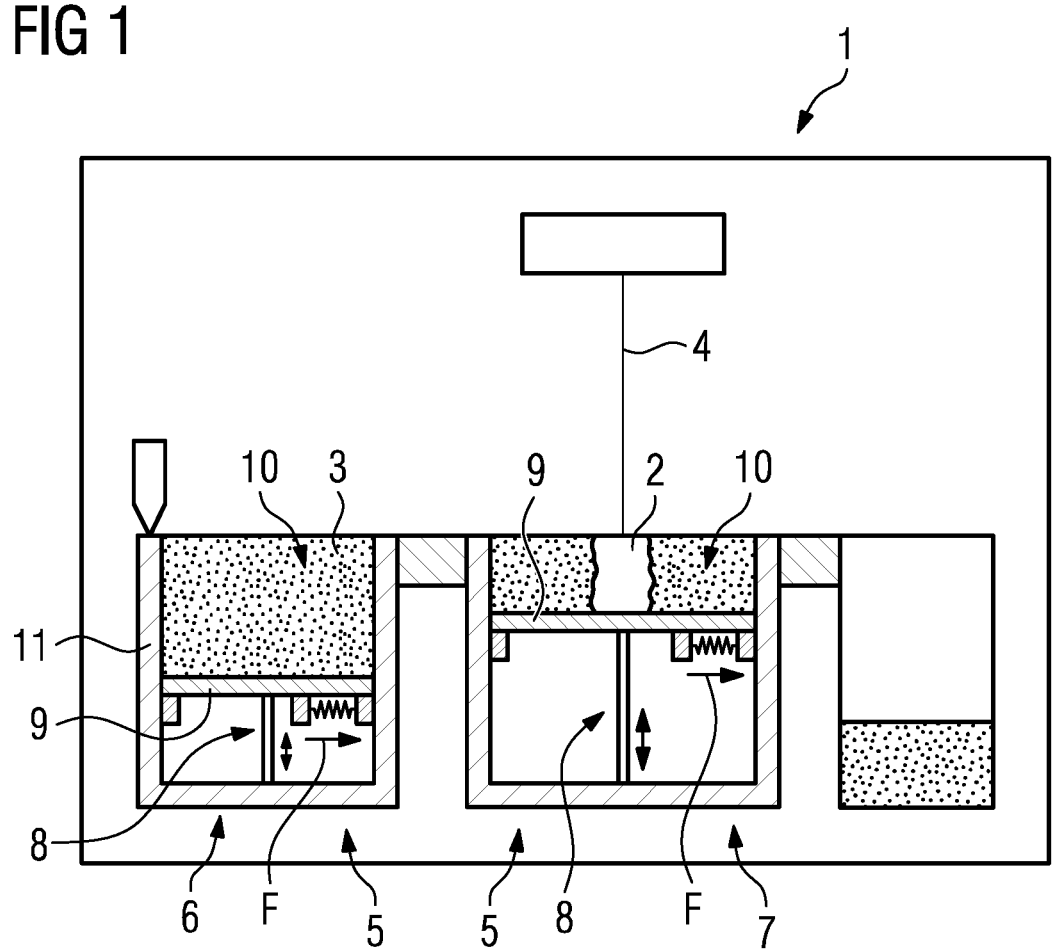

FIG. 1 shows an apparatus 1 for additively manufacturing of three-dimensional objects 2 by means of successive layerwise selective irradiation and consolidation of layers of a build material 3 which can be consolidated by means of an energy source 4, for example a laser beam. The apparatus 1 comprises two powder modules 5 that are built as a dose module 6 and as a build module 7. Yet, the apparatus 1 could also comprise only one respective powder module 5.

The powder modules 5 may be considered as separate powder modules 5 that can be separably connected with the apparatus 1 and disconnected from the apparatus 1, for example for refilling or emptying the powder modules 5. Each powder module 5 comprises a carrying device 8 with a carrying element 9, for example a height-adjustable dose plate or a height-adjustable build plate carrying the (powdery) build material 3 inside a powder chamber 10 of the respective powder module 5.

The powder chamber 10 comprises four wall portions 11 being arranged as a cuboid, for instance delimiting a powder room, i.e. a volume in which the build material 3 is received. The four wall portions 11 form two sets of opposing wall portions 11. As can further be derived from FIG. 1, the powder chamber 11 is delimited bottom sides by the carrying element 9, e.g. the dose plate or the build plate.

Figure 2:
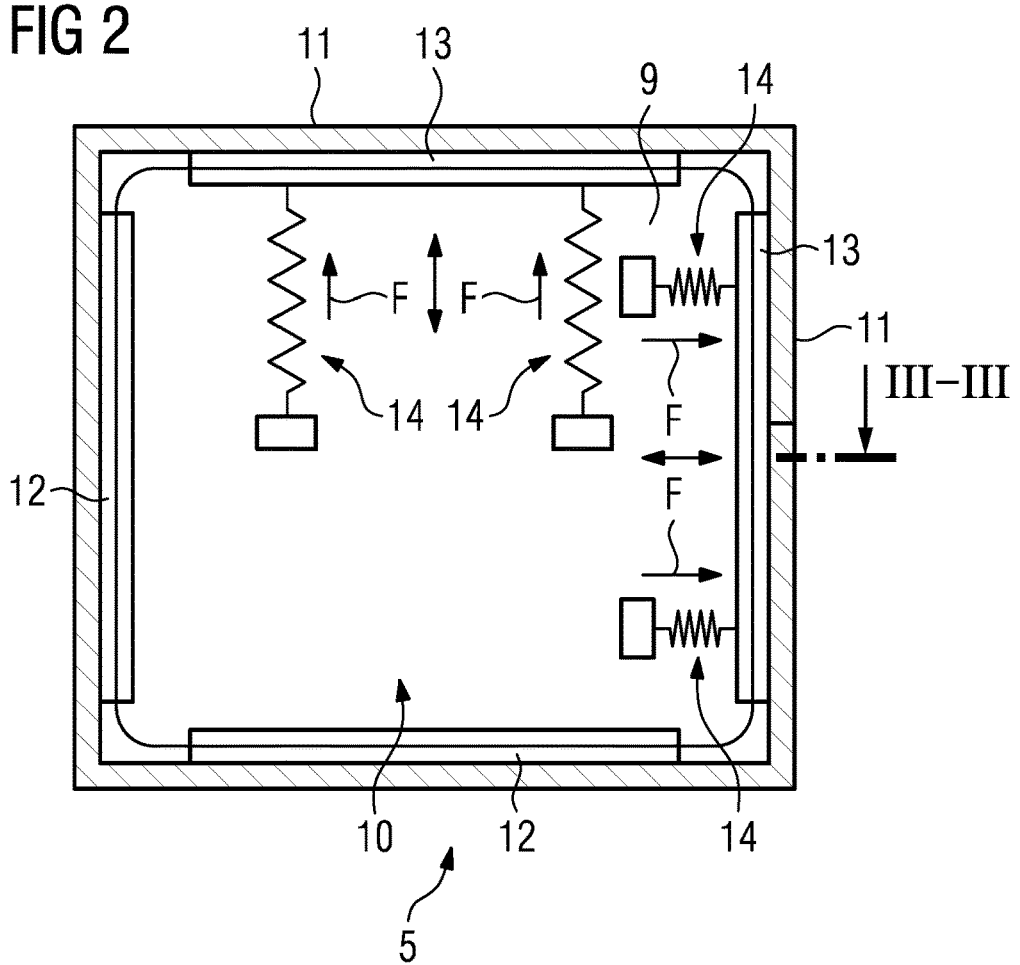
FIG. 2 shows a bottom view of a powder chamber of an inventive powder module.

FIG. 2 shows a bottom view on the carrier element 9. Attached to the carrier element 9, the powder module 5 comprises support units 12, 13, wherein the two support units 12 are solidly mounted to the carrying element 9 and wherein the support units 13 are movably mounted. Thus, the support units 12 are only moveable relative to the powder chamber wall portions 11 together with the carrying element 9, in particular vertically, and the support units 13 are additionally moveable relative to the carrying element 9 (as indicated by arrows). Of course, it is also possible that only the carrying element 9 of the dose module 6 or the build module 7 is supported via movably arranged support units 13.

FIG. 2 further shows that the powder module 5 comprises suspension units 14 that support the support units 13 against the carrying element 9. Thus, the suspension units 14 generate a suspension force (indicated by arrow F) that moves the assigned support unit 13 against the powder chamber wall portion 11 generating a non-locating bearing, wherein the support units 12 provide a locating bearing against the powder chamber 10. Thus, manufacturing tolerances of the powder chamber 10 and variances in the dimensions of the powder module 5, in particular of the carrying element 9 and the guide surfaces assigned to the carrying element 9 can be compensated by the non-locating bearing provided by the support units 13 supported by the suspension units 14.

Figure 3:
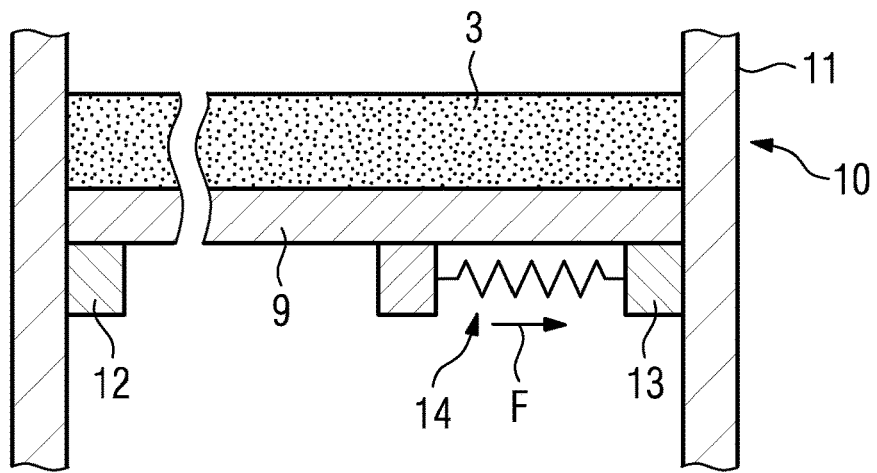
FIG. 3 shows a cross-sectional view of the powder chamber of FIGS. 1, 2.

FIG. 3 shows a cross section III-III as indicated in FIG. 2. The carrying element 9 can be moved laterally, in particular vertically relative to the powder chamber wall portion 11 of the powder chamber 10. By generating the suspension force onto the support unit 13 the assembly of the support unit 13 and the suspension unit 14 acts like a "damper" compensating manufacturing tolerances of the powder chamber 10, wherein the inside of the powder chamber 10 acts as a guiding surface on which the carrying element 9 is moved.

Figure 4:
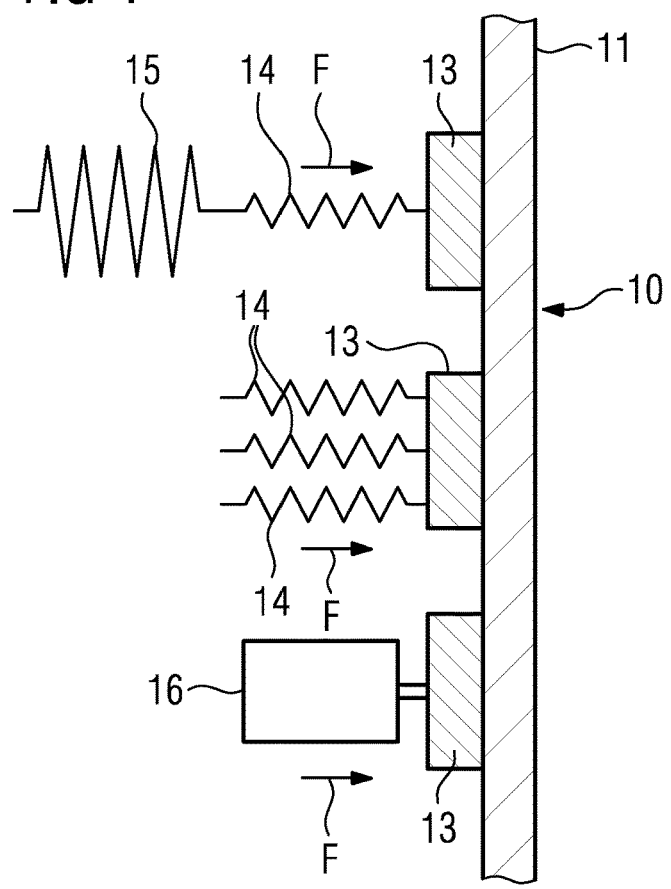
FIG. 4 shows an assembly of a suspension unit and a support unit according to a first embodiment.

FIG. 4 shows a detail of an exemplary non-locating bearing provided by three support units 13 that are supported via suspension units 14, 15, 16. The uppermost support unit 13 is supported via two suspension units 14, 15 that are connected in series. The two suspension units 14, 15 may differ in the spring rate or the stiffness, respectively. The suspension units 14, 15 may, for example, be built as mechanical spring elements, such as coil springs. The middle support unit 13 is supported via three suspension units 14 that are connected in parallel, wherein the three suspension units 14 may be the same suspension units 14 or differing from each other, for example regarding the spring rate or the stiffness, respectively.

Additionally, the lowermost support unit 13 is supported via a suspension unit 16 that is, for example, built as pneumatic element. Dependent on the pressure in the pneumatic element a suspension force is applied onto the lowermost support unit 13. The support units 13 may be built as sliding elements, in particular sliding pads. Additionally, the support units 13 may provide a guide, for example by building the support units 13 as guiding rails that interact with a complementary element in the assigned wall portion 11.

Figure 5:
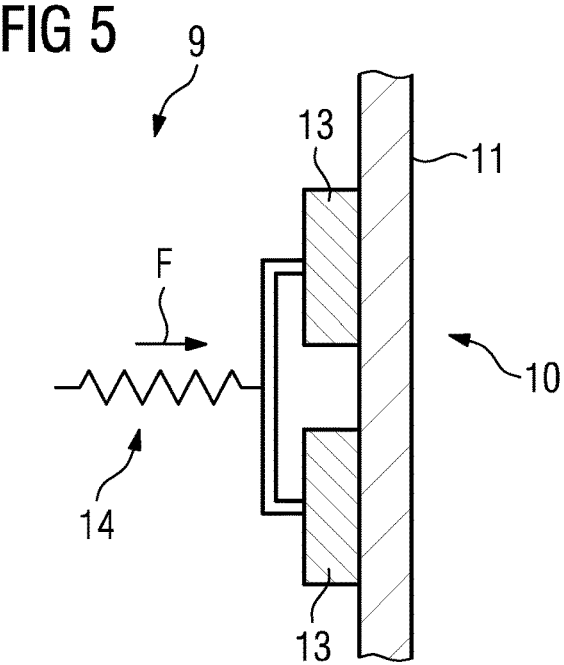
FIG. 5 shows an assembly of a suspension unit and a support unit according to a second embodiment.

FIG. 5 shows a bottom view of an assembly of two support units 13 and one suspension unit 14 analog to FIG. 2. As can be derived from FIG. 5, the single suspension unit 14 supports both support units 13. Of course, both support units 13 can be arranged above each other or neighboring each other. Self-evidently, an arbitrary number of support units 13 can be coupled and supported via one or more suspension units 14, 15, 16.

All features, details and advantages described with respect to the FIGS. 1 to 5 can be arbitrarily exchanged and transferred to the single embodiments, i.e. all embodiments can arbitrarily combined.

The invention claimed is:

1. A powder module for an apparatus for additively manufacturing three-dimensional objects, the powder module comprising:
    a powder chamber having at least one wall portion defining a powder room;
    a carrying element disposed within the powder room, the carrying element being moveably supported relative to the powder chamber;
    a non-locating support unit configured to provide a non-locating bearing of the carrying element relative to the at least one wall portion; and
    a locating support unit configured to provide a locating bearing of the carrying element;
    wherein the non-locating support unit is disposed about a first side of the carrying element and the locating support unit is disposed about a second side, opposing the first side, of the carrying element.

2. The powder module according to claim 1, wherein the non-locating support unit is moveably connecting the carrying element with the at least one wall portion, and wherein the non-locating support unit is moveable relative to the at least one wall portion and relative to the carrying element.

3. The powder module according to claim 1, further comprising a suspension unit configured to support the non-locating support unit and to generate a suspension force configured to force the non-locating support unit against the at least one wall portion.

4. The powder module according to claim 3, wherein the suspension unit comprises:
    at least one spring element;
    at least one hydraulic element;
    at least one pneumatic element; and/or
    at least one magnetic element.

5. The powder module according to claim 3, wherein the at least one wall portion comprises a first wall portion having a first orientation, wherein the non-locating support unit connects the carrying element with the first wall portion with the suspension unit supporting the non-locating support unit.

6. The powder module according to claim 3, further comprising an additional non-locating support unit and an additional suspension unit, wherein the at least one wall portion comprises a second wall portion having a second orientation, and wherein the additional non-locating support unit connects the carrying element with the second wall portion with the additional suspension unit supporting the additional non-locating support unit.

7. The powder module according to claim 1, wherein the at least one wall portion comprises a first wall portion and a second wall portion, the first wall portion facing the second wall portion, and wherein the carrying element is supported on at least one of the first wall portion and the second wall portion by the non-locating support unit.

8. The powder module according to claim 1, further comprising an additional non-locating support unit, wherein the carrying element is supported by the non-locating support unit and the additional non-locating support unit.

9. The powder module according to claim 8, wherein the non-locating support unit and the additional non-locating support unit are supported by the suspension unit.

10. The powder module according to claim 1, further comprising at least two suspension units configured to support to the non-locating support unit.

11. The powder module according to claim 1, wherein the non-locating support unit comprises at least one sliding element and/or at least one guide element.

12. An apparatus for additively manufacturing of three-dimensional objects, the apparatus comprising a powder module, the powder module comprising:
    a powder chamber having at least one wall portion defining a powder room;

a carrying element disposed within the powder room, the carrying element being moveably supported relative to the powder chamber;

a non-locating support unit disposed about a first side of the carrying element and configured to provide a non-locating bearing of the carrying element relative to the at least one wall portion; and a locating support unit disposed about a second side, opposing the first side, of the carrying element and configured to provide a locating bearing of the carrying element.

13. The apparatus according to claim 12, wherein the powder module comprises a dose module and/or a build module.

* * * * *